(12) United States Patent
Okamura et al.

(10) Patent No.: US 11,207,637 B2
(45) Date of Patent: Dec. 28, 2021

(54) GAS SEPARATING SYSTEM

(71) Applicant: TOYOTA JIDOSHA KABUSHIKI KAISHA, Toyota (JP)

(72) Inventors: Kazumasa Okamura, Gotemba (JP); Kouseki Sugiyama, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 115 days.

(21) Appl. No.: 16/599,246

(22) Filed: Oct. 11, 2019

(65) Prior Publication Data
US 2020/0122081 A1    Apr. 23, 2020

(30) Foreign Application Priority Data

Oct. 17, 2018   (JP) .............................. JP2018-195745

(51) Int. Cl.
*B01D 53/22* (2006.01)
*B01D 53/30* (2006.01)
*F01N 3/031* (2006.01)
*F01N 3/04* (2006.01)

(52) U.S. Cl.
CPC ........... *B01D 53/229* (2013.01); *B01D 53/30* (2013.01); *F01N 3/031* (2013.01); *F01N 3/04* (2013.01); *B01D 2053/221* (2013.01)

(58) Field of Classification Search
None
See application file for complete search history.

(56) References Cited

U.S. PATENT DOCUMENTS

| | | | | |
|---|---|---|---|---|
| 3,503,704 A * | 3/1970 | Marks | ................... | B01D 53/62 423/212 |
| 5,357,749 A * | 10/1994 | Ohsuga | ................. | B01D 53/30 60/274 |
| 5,540,047 A * | 7/1996 | Dahlheim | .............. | B01D 53/30 60/274 |
| 6,345,497 B1 * | 2/2002 | Penetrante | ............. | B01D 53/92 204/164 |
| 2005/0274104 A1 * | 12/2005 | Bromberg | ............... | F01N 3/031 60/275 |
| 2013/0333354 A1 | 12/2013 | Hamad | | |
| 2014/0102297 A1 * | 4/2014 | Hamad | .................. | B01D 53/22 95/51 |

FOREIGN PATENT DOCUMENTS

| | | |
|---|---|---|
| EP | 3070284 A1 | 9/2016 |
| JP | 2015-536814 A | 12/2015 |
| JP | 2017-115891 A | 6/2017 |
| JP | 2017-148736 A | 8/2017 |
| WO | 01/90541 A1 | 11/2001 |
| WO | 2011/137398 A1 | 11/2011 |

* cited by examiner

*Primary Examiner* — Jason M Greene
(74) *Attorney, Agent, or Firm* — Oliff PLC

(57) ABSTRACT

Separation efficiency of a gas in a gas separator mounted on a vehicle is improved. The gas separation system mounted on the vehicle provided with an internal combustion engine includes the gas separator configured to separate a predetermined component in the gas under the existence of water, a first passage connected to the gas separator so as to introduce an atmosphere into the gas separator, and a second passage connecting between an exhaust passage of the internal combustion engine and the first passage so as to introduce exhaust gas of the internal combustion engine into the gas separator.

10 Claims, 12 Drawing Sheets

| RUNNING CONDITIONS | INTERNAL COMBUSTION ENGINE | OPENING AND CLOSING VALVE | SWITCHING VALVE |
|---|---|---|---|
| 1 | STOP | CLOSED | HUMIDIFIER |
| 2 | OPERATION | OPENED | BYPASS PASSAGE |
| 3 | OPERATION | OPENED | HUMIDIFIER |

Fig. 4

GAS SEPARATING SYSTEM

CROSS REFERENCE TO RELATED APPLICATION

This application claims the benefit of Japanese Patent Application No. 2018-195745, filed on Oct. 17, 2018, which is hereby incorporated by reference herein in its entirety.

TECHNICAL FIELD

The present disclosure relates to a gas separation system.

BACKGROUND ART

There has been known a technology in which a mixed gas containing carbon dioxide is supplied to one surface of a first gas separation membrane, which is a gas separation membrane for selectively permeating the carbon dioxide in the mixed gas by supplying water to the mixed gas thereby to ionize the carbon dioxide, and water vapor is then supplied to a non-permeated gas, among the mixed gas, which has not permeated through the first gas separation membrane, thereby to form a humidified non-permeated gas, wherein the separation efficiency of carbon dioxide is enhanced by supplying the humidified non-permeated gas to one surface of a second gas separation membrane, which is a gas separation membrane (for example, refer to patent literature 1). Here, note that the separation efficiency of carbon dioxide is the ratio of an amount of separated carbon dioxide with respect to an amount of carbon dioxide having flowed into a carbon dioxide separation device. In addition, hereinafter, the separation efficiency of a gas is defined as the ratio of an amount of a separated predetermined component with respect to an amount of a predetermined component in the gas having flowed into a gas separation device.

CITATION LIST

Patent Literature

Patent Literature 1: Japanese patent application laid-open publication No. 2017-148736

SUMMARY

Technical Problem

With the technology described in the above-mentioned patent literature 1, it is not assumed that the technology is mounted on a vehicle, so a technology is desired that is mounted on a vehicle.

The present disclosure has been made in view of the problem as mentioned above, and the object of the present disclosure is to improve the separation efficiency of a gas in a gas separator mounted on a vehicle.

Solution to Problem

In order to solve the above-mentioned problem, according to one aspect of the present disclosure, there is provided a gas separation system which is mounted on a vehicle provided with an internal combustion engine, the gas separation system comprising: a gas separator configured to separate a predetermined component in a gas under the existence of water; a first passage connected to the gas separator so as to introduce an atmosphere into the gas separator; and a second passage connecting between an exhaust passage of the internal combustion engine and the first passage so as to introduce exhaust gas of the internal combustion engine into the gas separator.

The gas separator separates the predetermined component (e.g., NOx or HC, $CO_2$) in the gas, for example, by ionizing it under the existence of water (water vapor). When separating the predetermined component from the atmosphere, the water vapor contained in the atmosphere can be used, but the amount of the water vapor contained in the atmosphere may sometimes be insufficient. Here, by the provision of the second passage, the exhaust gas of the internal combustion engine can be supplied to the gas separator through the second passage. When fuel is burned in the internal combustion engine, water vapor will be generated, so the exhaust gas of the internal combustion engine includes a larger amount of water vapor than the atmosphere does. Accordingly, by supplying the exhaust gas of the internal combustion engine to the gas separator, water can be supplied to the gas separator, so the separation of the predetermined component can be promoted. In this manner, by mounting the gas separator on the vehicle provided with the internal combustion engine, the water vapor contained in the exhaust gas of the internal combustion engine can be supplied to the gas separator, thus making it possible to improve the separation efficiency of the gas.

The gas separator may have a gas separation membrane configured to separate a gas supply side and a gas permeation side, and the first passage may be connected to the gas supply side. For example, by ionizing the predetermined component (e.g., carbon dioxide) in the gas under the existence of water (water vapor), the gas separation membrane causes carbon dioxide to permeate therethrough. By supplying the atmosphere and the exhaust gas of the internal combustion engine to the gas supply side, the predetermined component contained in the atmosphere and/or the exhaust gas permeates to the gas permeation side, so the predetermined component can be separated from the atmosphere and/or the exhaust gas. Accordingly, by supplying the exhaust gas of the internal combustion engine to the gas supply side through the second passage, humidity at the gas supply side can be made higher, thus making it possible to promote the separation of the predetermined component.

The gas separation system may be further provided with a first humidifier configured to perform humidify the atmosphere flowing through the first passage. In cases where the internal combustion engine is stopped in a hybrid vehicle which can be run even during the stop of the internal combustion engine, the exhaust gas of the internal combustion engine can not be supplied to the gas separator. Accordingly, water vapor can not be supplied to the gas separator. On the other hand, by the provision of the first humidifier, it will become possible to supply water vapor to the gas separator during the stop of the internal combustion engine, too, so the separation of the predetermined component can be promoted. In addition, even if the exhaust gas of the internal combustion engine is introduced into the gas separator during the operation of the internal combustion engine, the amount of water vapor may be insufficient. In such a case, by humidifying the atmosphere by means of the humidifier, it is possible to increase the amount of the water vapor to be supplied to the gas separator.

The gas separation system may be further provided with: a bypass passage arranged to bypass the first humidifier; a switching valve configured to switch a path through which the atmosphere flows to either one of the first humidifier and the bypass passage; and a second valve configured to adjust a flow rate of the exhaust gas in the second passage. By circulating the atmosphere through the first humidifier by means of the switching valve, water vapor can be supplied to the atmosphere to be introduced into the gas separator. On the other hand, if the separation efficiency of the gas in the gas separator becomes sufficiently high by introducing the exhaust gas of the internal combustion engine to the gas separator even without supplying water vapor by the first humidifier, it will not be necessary to supply water vapor by the first humidifier. In this case, the supply of water vapor by the first humidifier can be stopped by circulating the atmosphere through the bypass passage by means of the switching valve. As a result of this, the energy consumed by the first humidifier can be decreased. In addition, the amount of the water vapor to be supplied to the gas separator can be easily adjusted by adjusting the amount of the exhaust gas to be introduced into the gas separator by means of the second valve. Here, note that the second valve may be a valve that can be adjusted to an arbitrary degree of opening, or may be a valve that can be adjusted to either a fully opened state or a fully closed state.

The gas separation system may be further provided with a controller configured to perform a task that the second valve is fully closed at the time of stop of the internal combustion engine. The exhaust gas of the internal combustion engine can not be supplied to the gas separator at the time of stop of the internal combustion engine. For that reason, the second valve can be fully closed. This can suppress the atmosphere from flowing back into the exhaust passage of the internal combustion engine through the second passage. Here, note that the expression "at the time of stop of the internal combustion engine" means "when a crankshaft of the internal combustion engine is not rotating", or "when fuel is not burning in the internal combustion engine".

The gas separation system may be further provided with a controller configured to perform a task that in cases where the amount of the atmosphere circulating through the first passage is less than a threshold value at the time of operation of the internal combustion engine, the atmosphere is circulated through the bypass passage by means of the switching valve, and the second valve is opened. As the amount of the atmosphere circulating through the first passage becomes larger, the amount of water vapor required becomes larger. Accordingly, when the amount of the atmosphere circulating through the first passage increases to become equal to or larger than the threshold value, the amount of water vapor may run short, even if the exhaust gas of the internal combustion engine is supplied to the gas separator. The threshold value referred to herein is a lower limit value of the amount of the atmosphere at which the amount of water vapor runs short, even if the exhaust gas of the internal combustion engine is supplied to the gas separator. On the other hand, when the amount of the atmosphere flowing through the first passage is less than the threshold value, a sufficient amount of water vapor can be supplied to the gas separator by introducing the exhaust gas of the internal combustion engine, so it is not necessary to humidify the atmosphere by the first humidifier. Accordingly, the atmosphere can be circulated through the bypass passage. With this, the energy consumed by the first humidifier can be reduced. Here, note that the expression "at the time of operation of the internal combustion engine" means "when the crankshaft of the internal combustion engine is rotating", or "when fuel is burning in the internal combustion engine".

The gas separation system may be further provided with a controller configured to perform a task that in cases where the amount of the atmosphere circulating through the first passage is equal to or larger than the threshold value at the time of operation of the internal combustion engine, the atmosphere is circulated through the first humidifier by means of the switching valve, and the second valve is opened. When the amount of the atmosphere circulating through the first passage increases to become equal to or larger than the threshold value, the amount of water vapor will run short in the gas separator, only by supplying thereto the exhaust gas of the internal combustion engine. In this case, by circulating the atmosphere through the first humidifier thereby to further supply water vapor to the gas separator, it is possible to improve the separation efficiency of the gas.

The gas separation system may be further provided with a controller configured to perform a task that in cases where the humidity of the gas to be introduced into the gas separator is less than a predetermined humidity at the time of operation of the internal combustion engine, the atmosphere is circulated through the first humidifier by means of the switching valve, and the second valve is opened, or in cases where the humidity of the gas to be introduced into the gas separator is equal to or higher than the predetermined humidity at the time of operation of the internal combustion engine, the atmosphere is circulated through the bypass passage by means of the switching valve, and the second valve is opened. By humidifying the atmosphere by means of the first humidifier only in cases where the humidity of the gas to be introduced into the gas separator is not sufficient, it is possible to suppress the humidification of the atmosphere from being carried out to an extent more than necessary by the first humidifier. The predetermined humidity is a lower limit value of the humidity at which the separation efficiency of the gas in the gas separator falls within an allowable range.

The gas separation system may be further provided with a controller that is configured to perform a task that in cases where the humidity of the gas to be introduced into the gas separator is lower than a lower limit value of a predetermined range, the atmosphere is circulated through the bypass passage by means of the switching valve, and the degree of opening of the second valve is made larger than a degree of opening thereof at a current point in time in cases where the second valve is not in a fully opened state, or the atmosphere is circulated through the first humidifier by means of the switching valve in cases where the second valve is in the fully opened state. In cases where the humidity of the gas to be introduced into the gas separator is lower than the lower limit value of the predetermined range, humidification is performed so that the humidity of the gas to be introduced into the gas separator is increased. Here, note that the predetermined range is a range in which the separation efficiency of the gas in the gas separator falls within an allowable range. It is considered that in order to make high the humidity of the gas to be introduced into the gas separator, the gas is humidified by the first humidifier, or by the exhaust gas of the internal combustion engine. Here, in the case of performing humidification by the exhaust gas of the internal combustion engine, it is just necessary to introduce the exhaust gas into the gas separator, but in the case of performing humidification by the first humidifier, it is necessary to store water, for example, so as to enable the first humidifier to perform humidification. For example, in cases where a user has to supply water to the first humidifier, the supply of water will be forced upon the user. In addition, when humidification is performed by the first humidifier, energy may be consumed in the first humidifier. Accordingly, the consumption of water and energy in the first humidifier can be suppressed by giving priority to the humidification by the exhaust gas of the internal combustion engine over the humidification by the first humidifier. Here, in cases where the second valve is not in the fully opened state, the amount of the exhaust gas flowing into the gas separator can be increased by making the degree of opening of the second valve larger. As a result of this, the humidity of the gas to be supplied to the gas separator can be enhanced. On the other hand, in cases where the humidity of the gas is low even if the second valve is in the fully opened state, the humidification by the first humidifier is further added. In this manner, the humidity of the gas to be introduced into the gas separator is maintained more than the lower limit value of the predetermined range, while suppressing the consumption of water and energy.

The gas separation system may be further provided with a controller configured to perform a task that in cases where the humidity of the gas to be introduced into the gas separator is higher than an upper limit value of a predetermined range, the switching valve is switched so as to allow the atmosphere to circulate through the bypass passage in cases where the atmosphere is circulated through the first humidifier by means of the switching valve, or the degree of opening of the second valve is made smaller than a degree of opening thereof at a current point in time, in cases where the atmosphere is circulated through the bypass passage by means of the switching valve. When the humidity of the gas to be introduced into the gas separator becomes higher than the upper limit value of the predetermined range, the separation efficiency of the gas will decrease, for example, due to the generation of dew condensation in the gas separation membrane. In such a case, the humidity of the gas to be introduced into the gas separator is decreased. At this time, the consumption of water and energy is suppressed by stopping the humidification by the first humidifier in a preferential manner. Then, in cases where the humidity of the gas is still higher than the upper limit of the predetermined range even if the atmosphere is circulated through the bypass passage, the amount of the exhaust gas to be introduced into the gas separator is decreased by making the degree of opening of the second valve smaller. This serves to maintain the humidity of the gas to be introduced into the gas separator at a value equal to or less than the upper limit value of the predetermined range.

The gas separation system may be further provided with: a second humidifier configured to humidify the exhaust gas of the internal combustion engine circulating through the second passage; a second bypass passage arranged to bypass the second humidifier; a second switching valve configured to switch a path through which the exhaust gas of the internal combustion engine flows to either one of the second humidifier and the second bypass passage; and a controller configured to perform a task that in cases where the humidity of the gas to be introduced into the gas separator is less than a predetermined humidity, the exhaust gas of the internal combustion engine is circulated through the second humidifier by means of the second switching valve, or in cases where the humidity of the gas to be introduced into the gas separator is equal to or higher than the predetermined humidity, the exhaust gas of the internal combustion engine is circulated through the second bypass passage by means of the second switching valve. By arranging the second humidifier in the second passage, it is also possible to make further higher the humidity of the gas to be introduced into the gas separator. In addition, by the provision of the second bypass passage, it is possible to suppress the humidity of the gas to be introduced into the gas separator from becoming higher than necessary.

The gas separation system may be further provided with an exhaust gas purification device configured to purify the exhaust gas of the internal combustion engine, the exhaust gas purification device being arranged in the exhaust passage at the upstream side of a location at which the second passage is connected to the exhaust passage. The exhaust gas purification device is an exhaust gas purification catalyst or a particulate filter, for example. When the exhaust gas passes through the exhaust gas purification device, HC, particulate matter (PM), etc., which are contained in the exhaust gas, can be removed. When flowing into the gas separator, these substances may inhibit the separation of the gas. Accordingly, by the provision of the exhaust gas purification device, it is possible to suppress the separation efficiency of the gas from becoming low.

According to the present disclosure, it is possible to improve the separation efficiency of a gas in a gas separator mounted on a vehicle.

BRIEF DESCRIPTION OF DRAWINGS

FIG. 4 is a view illustrating states of a switching valve and an opening and closing valve according to driving conditions.

DESCRIPTION OF EMBODIMENTS

Hereinafter, modes for carrying out the present disclosure will be described in detail by way of example based on preferred embodiments thereof with reference to the attached drawings. However, the dimensions, materials, shapes, relative arrangements and so on of component parts described in the embodiments are not intended to limit the scope of the present disclosure to these alone in particular as long as there are no specific statements.

First Embodiment

Figure 1:
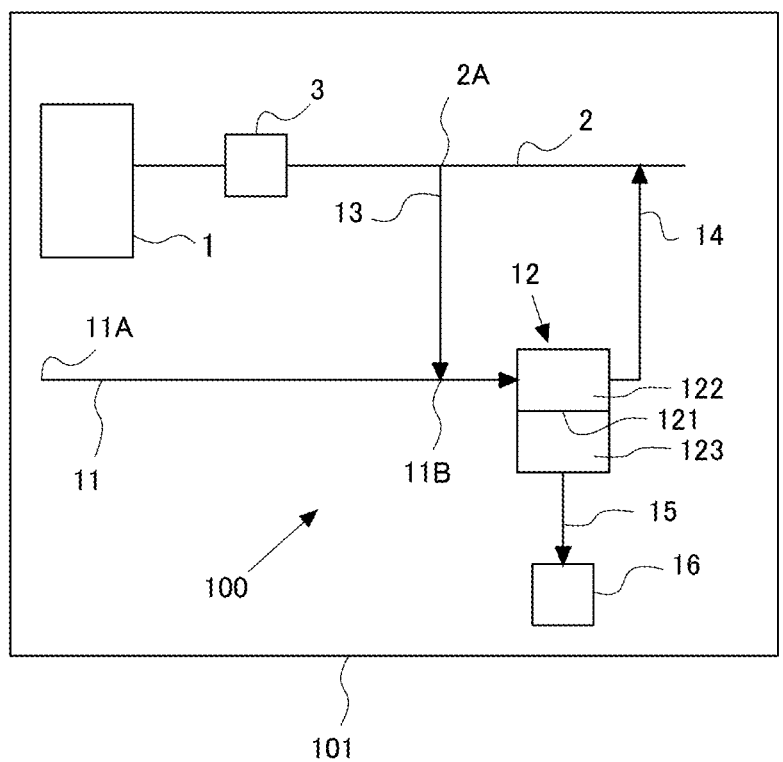
FIG. 1 is a view illustrating the schematic configuration of a carbon dioxide separation system according to a first embodiment of the present disclosure.

FIG. 1 is a view illustrating the schematic configuration of a carbon dioxide separation system 100 according to a first embodiment of the present disclosure. The carbon dioxide separation system 100 is mounted on a vehicle 101. On the vehicle 101, there is mounted an internal combustion engine 1. Here, note that the vehicle 101 may be a hybrid vehicle having, as a driving source, an electric motor in addition to the internal combustion engine 1. The internal combustion engine 1 is a gasoline engine or a diesel engine, for example. An exhaust passage 2 is connected to the internal combustion engine 1. An exhaust gas purification device 3 is arranged in the exhaust passage 2. The exhaust gas purification device 3 is an exhaust gas purification catalyst or a particulate filter, for example. The exhaust gas purification catalyst is a catalyst that serves to perform purification or adsorption, occlusion (storage), etc., of substances contained in the exhaust gas, and it is, for example, a three-way catalyst, an oxidation catalyst, an NOx storage reduction catalyst, or an NOx selective catalytic reduction catalyst. The filter has a function to trap particulate matter (hereinafter, also referred to as PM) in the exhaust gas.

The carbon dioxide separation system 100 includes a first passage 11, a carbon dioxide separator 12, and a second passage 13. The first passage 11 is opened into the atmosphere in an introduction portion 11A at one end side thereof, and is connected at the other end side thereof to the carbon dioxide separator 12. The second passage 13 connects the exhaust passage 2 and the first passage 11 with each other. The second passage 13 has its one end side branched from the exhaust passage 2 at a branch portion 2A of the exhaust passage 2, and its other end side merged with the first passage 11 at a merge portion 11B of the first passage 11. The introduction portion 11A of the first passage 11 is formed so as to introduce the atmosphere (air) into the first passage 11 by making use of running wind at the time of running of the vehicle 101. Here, note that the running wind is the flow of the atmosphere (air) generated relatively between the vehicle 101 and the outside of the vehicle 101 while the vehicle 101 is running.

The carbon dioxide separator 12 is to separate carbon dioxide from the atmosphere and the exhaust gas. The carbon dioxide separator 12 is provided with a carbon dioxide separation membrane 121 formed in the shape of a membrane which mainly passes carbon dioxide among the components contained in the atmosphere and the exhaust gas. The carbon dioxide separation membrane 121 divides the interior space of the carbon dioxide separator 12 into two parts, i.e., a supply side 122 and a permeation side 123. To the supply side 122, there are connected the first passage 11 at the other end side thereof and a return passage 14 at one end side thereof. The return passage 14 is connected at the other end side thereof to the exhaust passage 2 at a location downstream of the branch portion 2A. In addition, to the permeation side 123, there is connected a carbon dioxide discharge passage 15 at one end side thereof. The carbon dioxide discharge passage 15 is connected at the other end side thereof to a tank 16 that stores carbon dioxide. Here, note that the other end side of the carbon dioxide discharge passage 15 may be connected to a device that decomposes carbon dioxide into carbon (C) and oxygen ($O_2$) under the action of plasma, or a device that synthesizes hydrocarbon from carbon dioxide, instead of the tank 16.

When the gas containing water (water vapor) and carbon dioxide is supplied to the supply side 122 of the carbon dioxide separator 12 through the first passage 11, the carbon dioxide will be ionized by the carbon dioxide separation membrane 121 thereby to selectively permeate through the carbon dioxide separation membrane 121. Accordingly, the carbon dioxide in the gas having flowed into the supply side 122 passes through the carbon dioxide separation membrane 121, so that it is separated from the other components. The gas with the carbon dioxide separated therefrom in the carbon dioxide separation membrane 121 is discharged into the exhaust passage 2 through the return passage 14. On the other hand, the gas having passed through the carbon dioxide separation membrane 121 flows through the carbon dioxide discharge passage 15, so that it is stored in the tank 16. In this manner, the gas whose concentration of carbon dioxide is relatively low flows into the return passage 14, whereas the gas whose concentration of carbon dioxide is relatively high flows into the carbon dioxide discharge passage 15.

In the carbon dioxide separation membrane 121, water (water vapor) is required in order to separate carbon dioxide. Water vapor is contained in the atmosphere, too, but it may be insufficient for separating carbon dioxide in the atmosphere. Accordingly, the exhaust gas of the internal combustion engine 1 is supplied to the carbon dioxide separator 12 through the second passage 13. Water vapor is generated due to the burning or combustion of hydrocarbon in the internal combustion engine 1, so a larger amount of water vapor is contained in the exhaust gas of the internal combustion engine 1 than in the atmosphere. That is, the water vapor can be supplied to the carbon dioxide separator 12 by supplying the exhaust gas of the internal combustion engine 1 to the carbon dioxide separator 12. Thus, even in cases where carbon dioxide can not be sufficiently separated by the water vapor of the atmosphere, the water vapor contained in the exhaust gas of the internal combustion engine 1 can be supplied to the carbon dioxide separator 12, by mounting the carbon dioxide separator 12 on the vehicle 101. With this, the separation efficiency of carbon dioxide can be further enhanced. In addition, because water vapor can be supplied only by supplying the exhaust gas to the carbon dioxide separator 12, a required amount of energy can be smaller than in the case where a humidifier for adding water vapor to the atmosphere is separately provided, for example. Moreover, the user does not need to supply water to the carbon dioxide separation system 100.

Here, note that the exhaust gas purification device 3 is not an indispensable configuration (component), but by the provision of the exhaust gas purification device 3, the amounts of HC and PM, for example, flowing into the carbon dioxide separator 12 can be reduced. This can suppress HC and PM from adhering to the carbon dioxide separation membrane 121, and as a result, a decrease in the separation efficiency of carbon dioxide due to the HC and PM adhering to the carbon dioxide separation membrane 121 can be suppressed.

Here, note that in the second passage 13, there may be arranged a heat exchanger for decreasing the temperature of the exhaust gas by carrying out heat exchange between the exhaust gas and the outside air. In that case, the temperature of the gas flowing into the carbon dioxide separator 12 can be decreased to a temperature more suitable for the separation of carbon dioxide, so the separation efficiency of carbon dioxide can be enhanced. In addition, water may be separated from the exhaust gas in the second passage 13, and only the water thus separated may be supplied to the carbon dioxide separator 12. In this case, for example, water may be condensed from the exhaust gas by using running wind. Moreover, water and carbon dioxide may be separated from the exhaust gas in the second passage 13, and the water and carbon dioxide thus separated may be supplied to the carbon dioxide separator 12.

Here, note that in place of the carbon dioxide separator 12, there can be similarly applied other devices that separate a predetermined component(s) under the existence of water. The other devices may be devices which separate NOx and/or HC, for example. A wet NOx adsorption purification device can be exemplified as a device for separating NOx. This wet NOx adsorption purification device adsorbs NOx as nitrates by using an absorbing solution. In the NOx adsorption purification device, ionization of NOx is promoted by supplying water vapor, so the efficiency of adsorption of NOx absorbed as nitrates by the absorbing solution is enhanced.

Second Embodiment

Figure 2:
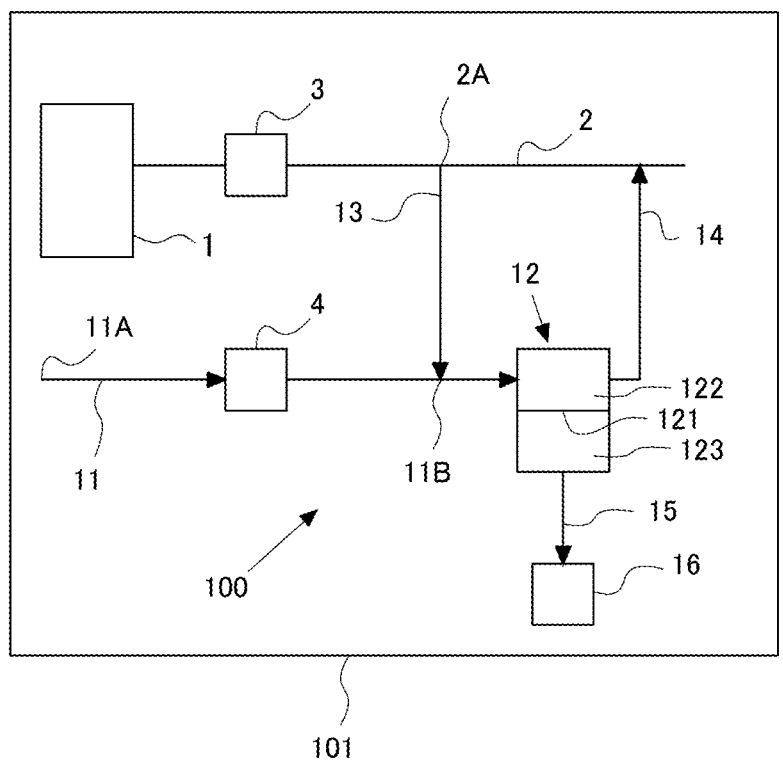
FIG. 2 is a view illustrating the schematic configuration of a carbon dioxide separation system according to a second embodiment of the present disclosure.

FIG. 2 is a view illustrating the schematic configuration of a carbon dioxide separation system 100 according to a second embodiment of the present disclosure. Differences of FIG. 2 (this second embodiment) from FIG. 1 (the above-mentioned first embodiment) will be mainly explained. The carbon dioxide separation system 100 according to this second embodiment has a humidifier 4 arranged in the first passage 11. Here, note that in FIG. 2, the humidifier 4 is arranged in the first passage 11 at the upstream side of the merge portion 11B, but instead of this, it can also be arranged in the first passage 11 at the downstream side of the merge portion 11B. The humidifier 4 is not limited to the configuration illustrated in FIG. 2, as long as it is capable of performing humidification to the atmosphere. For example, the humidifier 4 may be a device that performs humidification by carrying out bubbling, while introducing the atmosphere into a tank with water stored therein. In addition, the humidifier 4 may also be a device that performs humidification with the use of an ion exchange membrane, for example. Moreover, the humidifier 4 may also be a device that is provided with a nozzle for injecting water into the first passage 11, for example. The water to be supplied can also be supplied by the user, or waste water from an air-conditioner, rain water or condensed water of the exhaust gas can also be used, for example. The condensed water of the exhaust gas may be the water condensed in the second passage 13. The humidifier 4 is an example of a first humidifier according to the present disclosure.

Here, in cases where the vehicle 101 is a hybrid vehicle, the vehicle 101 can be run by means of an electric motor, so even in cases where the internal combustion engine 1 is in a stopped state, the atmosphere can be introduced into the first passage 11. However, in this case, the exhaust gas of the internal combustion engine 1 can not be introduced into the carbon dioxide separator 12. For that reason, there is a fear that a sufficient amount of water vapor can not be supplied to the carbon dioxide separator 12. On the other hand, in this second embodiment, provision is made for the humidifier 4. When it becomes possible to perform humidification by the humidifier 4, water vapor can be supplied to the carbon dioxide separator 12 even when the internal combustion engine 1 has been stopped. In addition, even in cases where the internal combustion engine 1 is in operation, water vapor can be supplied to the carbon dioxide separator 12 from the humidifier 4 together with the exhaust gas, so it becomes possible to supply a larger amount of water vapor to the carbon dioxide separator 12.

Third Embodiment

Figure 3:
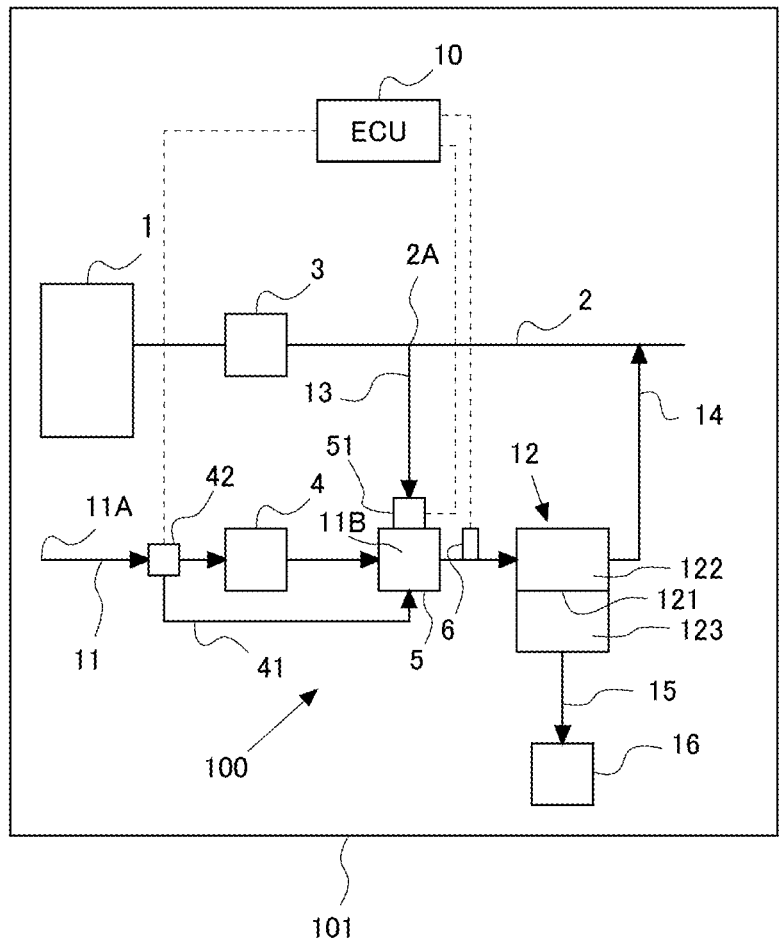
FIG. 3 is a view illustrating the schematic configuration of a carbon dioxide separation system according to a third embodiment and a fourth embodiment of the present disclosure.

FIG. 3 is a view illustrating the schematic configuration of a carbon dioxide separation system 100 according to a third embodiment of the present disclosure. Differences of FIG. 3 (this third embodiment) from FIG. 1 and FIG. 2 will be mainly explained. The carbon dioxide separation system 100 according to this third embodiment further includes: a bypass passage 41 that is a passage for connecting an upstream side and a downstream side of the humidifier 4, while bypassing the humidifier 4; a switching valve 42 that switches an atmospheric passage in order to circulate gas to either one of the humidifier 4 and the bypass passage 41; a gas mixing unit 5 arranged in the merge portion 11B; an opening and closing valve 51 arranged at a location at which the second passage 13 is connected to the gas mixing unit 5; and a humidity sensor 6 for detecting a humidity of the gas circulating through the first passage 11 at the downstream side of the gas mixing unit 5. Here, note that the humidity sensor 6 is arranged in the first passage 11 at the downstream side of the merge portion 11B, but it may instead be arranged in the first passage 11 at the upstream side of the switching valve 42 in cases where the humidity of the exhaust gas is known. In this case, the humidity of the gas to be introduced into the carbon dioxide separator 12 can be calculated based on the humidity detected by the humidity sensor 6 and the humidity of the exhaust gas. The opening and closing valve 51 is an example of a second valve according to the present disclosure.

The bypass passage 41 has its one end connected to the switching valve 42, and its other end connected to the gas mixing unit 5. Here, note that instead of the switching valve 42, there may be arranged a valve for connecting either one of the humidifier 4 and the bypass passage 41 to the gas mixing unit 5 may be arranged in the gas mixing unit 5. In addition, the other end of the bypass passage 41 can also be connected to the first passage 11 at an arbitrary location downstream of the humidifier 4 and upstream of the humidity sensor 6. Moreover, the opening and closing valve 51 can be arranged at an arbitrary location of the second passage 13. The opening and closing valve 51 can be maintained in either a fully opened state or a fully closed state. The gas mixing unit 5 should just have a certain amount of volume in order to mix the exhaust gas and the atmosphere with each other, but this gas mixing unit 5 is not necessarily required. Further, although in this third embodiment, the bypass passage 41 is provided, it is not required if the humidification to the gas passing through the humidifier 4 can be stopped by stopping the function of the humidifier 4. That is, the function of the humidifier 4 may be stopped, instead of circulating the gas through the bypass passage 41.

Then, an electronic control unit (ECU) 10, which is a controller, is provided along with the internal combustion engine 1. The ECU 10 is a computer having a processor, a main storage unit, and an auxiliary storage unit. The ECU 10 controls the operating state of the internal combustion engine 1, an exhaust gas purification system, the carbon dioxide separation system 100, etc. The humidity sensor 6 is electrically connected to the ECU 10, so that the detected value of the humidity sensor 6 is passed to the ECU 10. In addition, the switching valve 42 and the opening and closing valve 51 are electrically connected to the ECU 10, so that the ECU 10 controls these valves 42 and 51. At this time, the processor executes a predetermined program on the main storage unit.

The ECU 10 controls the switching valve 42 and the opening and closing valve 51 based on driving conditions of the vehicle. The driving conditions are divided into the following three conditions or cases (1) through (3). In the case of (1), the amount of the atmosphere to be introduced into the first passage 11 is less than a threshold value, and the internal combustion engine 1 is stopped; in the case of (2), the amount of the atmosphere to be introduced into the first passage 11 is less than the threshold value, and the internal combustion engine 1 is in operation; and in the case of (3), the amount of the atmosphere to be introduced into the first passage is equal to or more than the threshold value, and the internal combustion engine 1 is in operation. FIG. 4 is a view illustrating states of the switching valve 42 and the opening and closing valve 51 corresponding to the driving conditions. Items 1 through 3 in FIG. 4 corresponds (1) through (3) of the above-mentioned driving conditions. In a column of "INTERNAL COMBUSTION ENGINE" in FIG. 4, "STOP" indicates that the internal combustion engine 1 is in the stopped state, and "OPERATION" indicates that the internal combustion engine 1 is in operation. In a column of "OPENING AND CLOSING VALVE", "CLOSED" indicates that the opening and closing valve 51 is in a closed state, and "OPENED" indicates that the opening and closing valve 51 in in an opened state. In a column of "SWITCHING VALVE", "HUMIDIFICATION DEVICE" indicates that the switching valve 42 is in a state where the introduction portion 11A, the humidifier 4 and the carbon dioxide separator 12 are in communication with one another, and "BYPASS PASSAGE" indicates that the switching valve 42 is in a state where the introduction portion 11A, the bypass passage 41 and the carbon dioxide separator 12 are in communication with one another.

Figure 5:
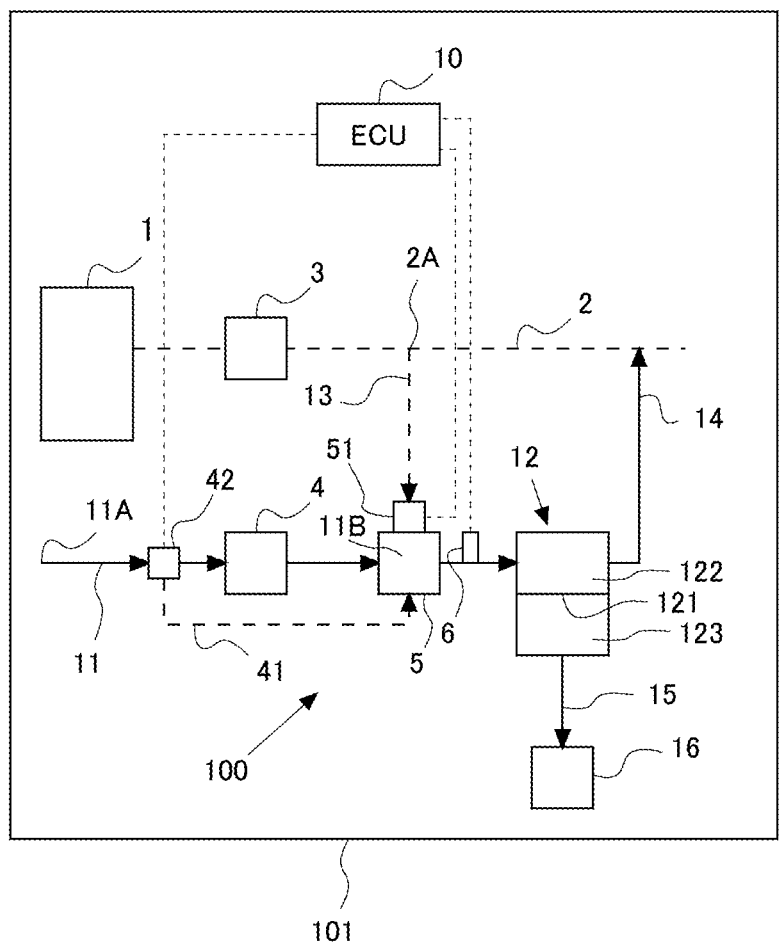
FIG. 5 is a view illustrating the flow of gas in the case of a driving condition (1).

In the driving condition (1), the internal combustion engine 1 is in the stopped state. In this case, by driving the vehicle 101 by means of an electric motor, atmosphere may be introduced into the first passage 11, or by means of a pump, etc., for example, atmosphere may be introduced into the first passage 11. At this time, because water vapor can not be supplied to the carbon dioxide separator 12 by the exhaust gas of the internal combustion engine 1, water vapor is supplied to the carbon dioxide separator 12 by means of the humidifier 4. For that reason, the opening and closing valve 51 is closed. In addition, the switching valve 42 is switched so that the atmosphere may circulate through the humidifier 4. Here, note that FIG. 5 is a view illustrating the flow of the gas in the case of the driving condition (1). In FIG. 5, solid lines indicate locations through which the gas is flowing, and broken lines indicate locations through which the gas is not flowing. Thus, in the driving condition (1), water vapor is supplied to the carbon dioxide separator 12 by the humidifier 4.

Figure 6:
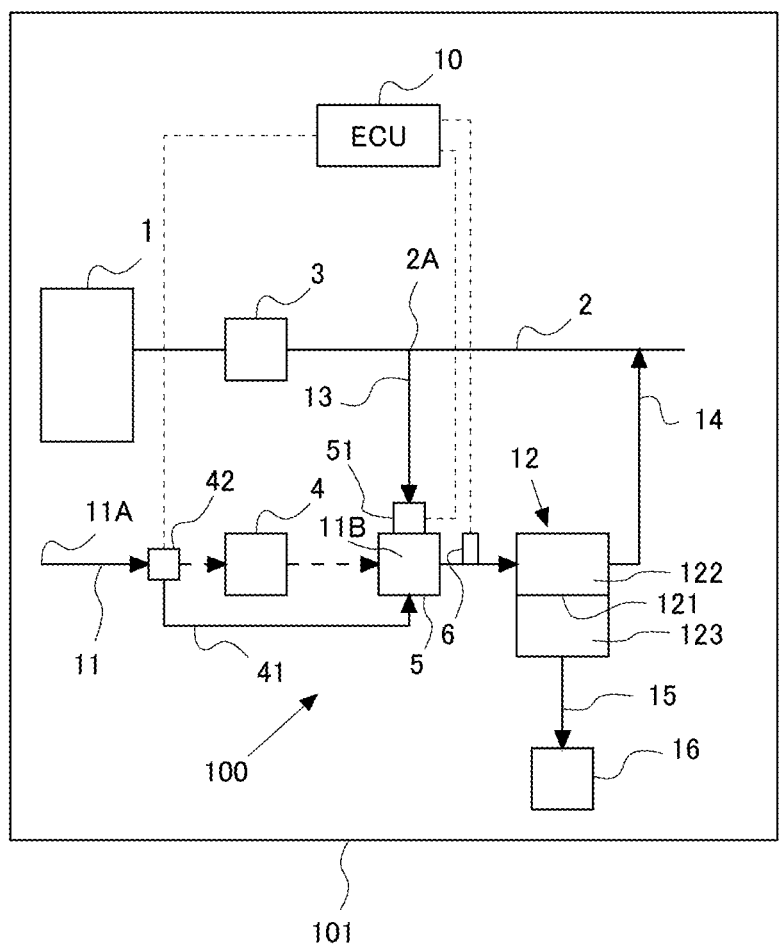
FIG. 6 is a view illustrating the flow of gas in the case of a driving condition (2).

In the driving condition (2), the internal combustion engine 1 has been operated. For that reason, water vapor can be supplied to the carbon dioxide separator 12 by the exhaust gas of the internal combustion engine 1. Accordingly, the opening and closing valve 51 is opened so that the exhaust gas of the internal combustion engine 1 can be introduced into the carbon dioxide separator 12. In addition, the amount of the atmosphere to be introduced into the first passage 11 at this time is less than a threshold value, and it is relatively small, so when the exhaust gas of the internal combustion engine 1 is supplied to the carbon dioxide separator 12, a sufficient amount of water vapor can be supplied to the carbon dioxide separator 12. Accordingly, because it is not necessary to perform humidification by the humidifier 4, the switching valve 42 is switched so that the atmosphere can circulate through the bypass passage 41. Here, note that the amount of the atmosphere to be introduced into the first passage 11 is in correlation with the speed of the vehicle 101, so it can be obtained based on the speed of the vehicle 101. Moreover, the amount of the atmosphere to be introduced into the first passage 11 can also be detected by arranging a flow rate sensor in the first passage 11. The threshold value is a lower limit value of the amount of the atmosphere at which humidification by the humidifier 4 is required. Here, note that FIG. 6 is a view illustrating the flow of the gas in the case of the driving condition (2). In FIG. 6, solid lines indicate locations through which the gas is flowing, and broken lines indicate locations through which the gas is not flowing. Thus, in the driving condition (2), water vapor is supplied to the carbon dioxide separator 12 by the exhaust gas of the internal combustion engine 1.

Figure 7:
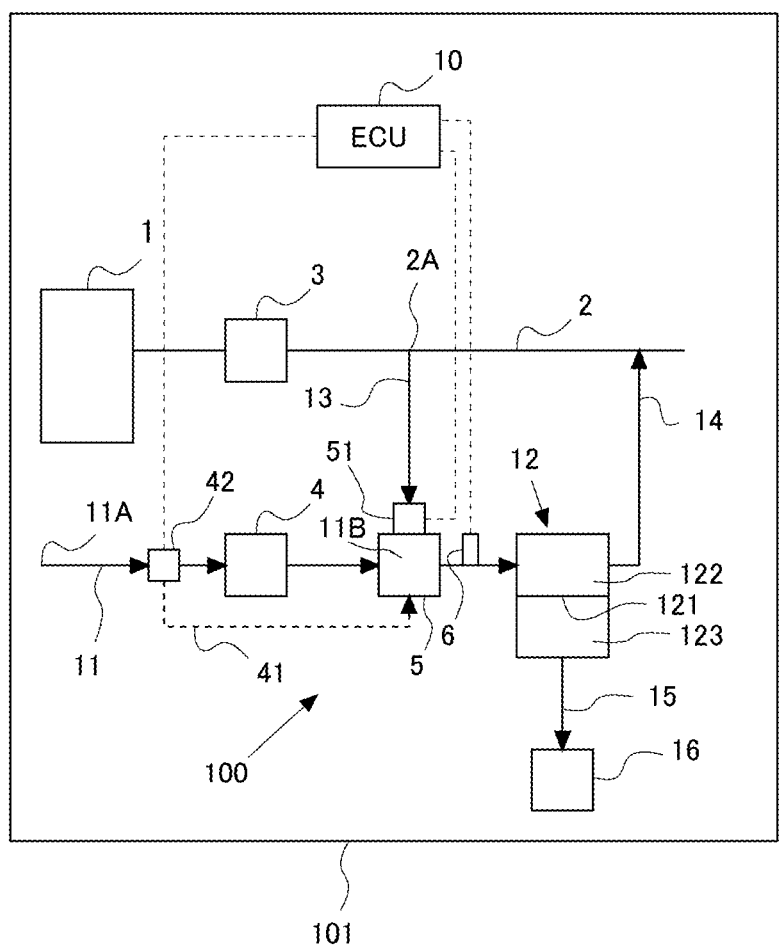
FIG. 7 is a view illustrating the flow of gas in the case of a driving condition (3).

In the driving condition (3), the internal combustion engine 1 is in operation. For that reason, water vapor can be supplied to the carbon dioxide separator 12 by the exhaust gas of the internal combustion engine 1. Accordingly, the opening and closing valve 51 is opened so that the exhaust gas of the internal combustion engine 1 can be introduced into the carbon dioxide separator 12. However, because the amount of the atmosphere to be introduced into the first passage 11 is equal to or larger than the threshold value, the amount of the water vapor to be supplied by the exhaust gas becomes relatively smaller with respect to the amount of the atmosphere to be introduced, so that water vapor runs short in the carbon dioxide separator 12. For that reason, it is necessary to supply water vapor to the carbon dioxide separator 12 by means of the humidifier 4. Accordingly, the switching valve 42 is switched so that the atmosphere can circulate through the humidifier 4. Here, note that FIG. 7 is a view illustrating the flow of the gas in the case of the driving condition (3). In FIG. 7, solid lines indicate locations through which the gas is flowing, and broken lines indicate locations through which the gas is not flowing. Thus, in the driving condition (3), water vapor is supplied to the carbon dioxide separator 12 by means of the exhaust gas of the internal combustion engine 1 and the humidifier 4.

Figure 8:
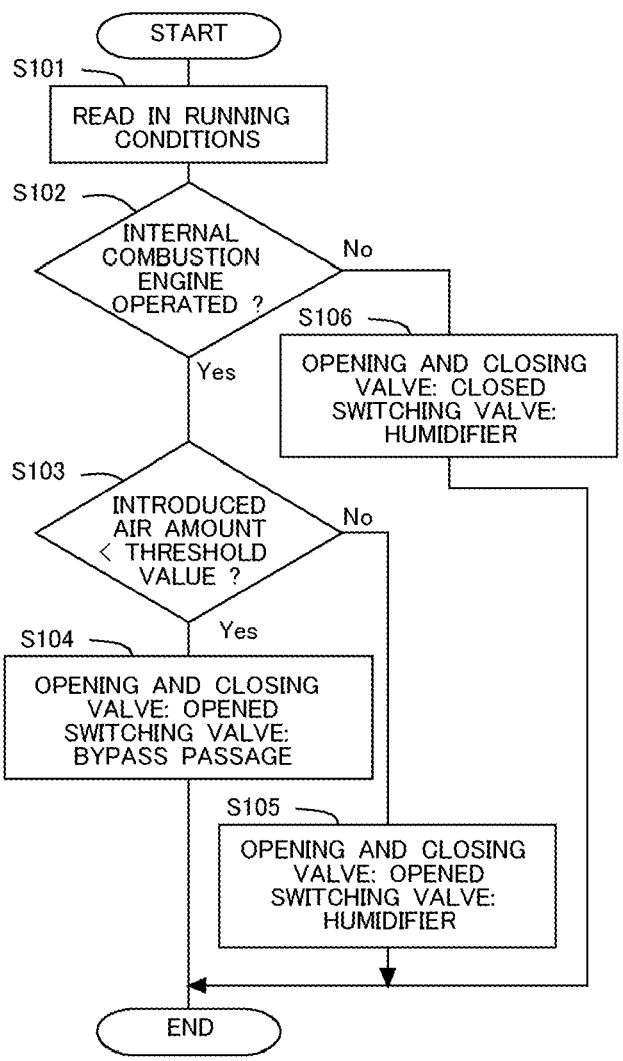
FIG. 8 is a flow chart illustrating a control flow or routine for separating carbon dioxide according to the third embodiment of the present disclosure.

FIG. 8 is a flow chart illustrating a control flow or routine for separating carbon dioxide according to this third embodiment of the present disclosure. The routine in this flow chart is carried out by means of the ECU 10 at each predetermined time interval. In step S101, the driving conditions are read in. Here, information capable of determining whether the internal combustion engine 1 is in operation, and whether the amount of the atmosphere to be introduced in the first passage 11 (the introduced atmosphere amount) is less than the threshold value is read in. Then, in step S102, it is determined whether the internal combustion engine 1 is in operation. In cases where an affirmative determination is made in step S102, the routine goes to step S103. On the other hand, in cases where a negative determination is made in step S102, this corresponds to the above-mentioned driving condition (1), so the routine goes to step S106, in which the opening and closing valve 51 is closed and the switching valve 42 is switched so that the atmosphere can circulate through the humidifier 4.

In step S103, it is determined whether the introduced atmosphere amount is less than the threshold value. In cases where an affirmative determination is made in step S103, this corresponds to the above-mentioned driving condition (2), so the routine goes to step S104, in which the opening and closing valve 51 is opened and the switching valve 42 is switched so that the atmosphere can circulate through the bypass passage 41. On the other hand, in cases where a negative determination is made in step S103, this corresponds to the above-mentioned driving condition (3), so the routine goes to step S105, in which the opening and closing valve 51 is opened and the switching valve 42 is switched so that the atmosphere can circulate through the humidifier 4.

As described above, according to the carbon dioxide separation system 100 of this third embodiment, by controlling the opening and closing valve 51 and the switching valve 42 according to the driving conditions by means of the ECU 10, it is possible to maintain the humidity of the gas to be supplied to the carbon dioxide separator 12 in an appropriately manner. This can improve the separation efficiency of carbon dioxide.

Fourth Embodiment

Figure 9:
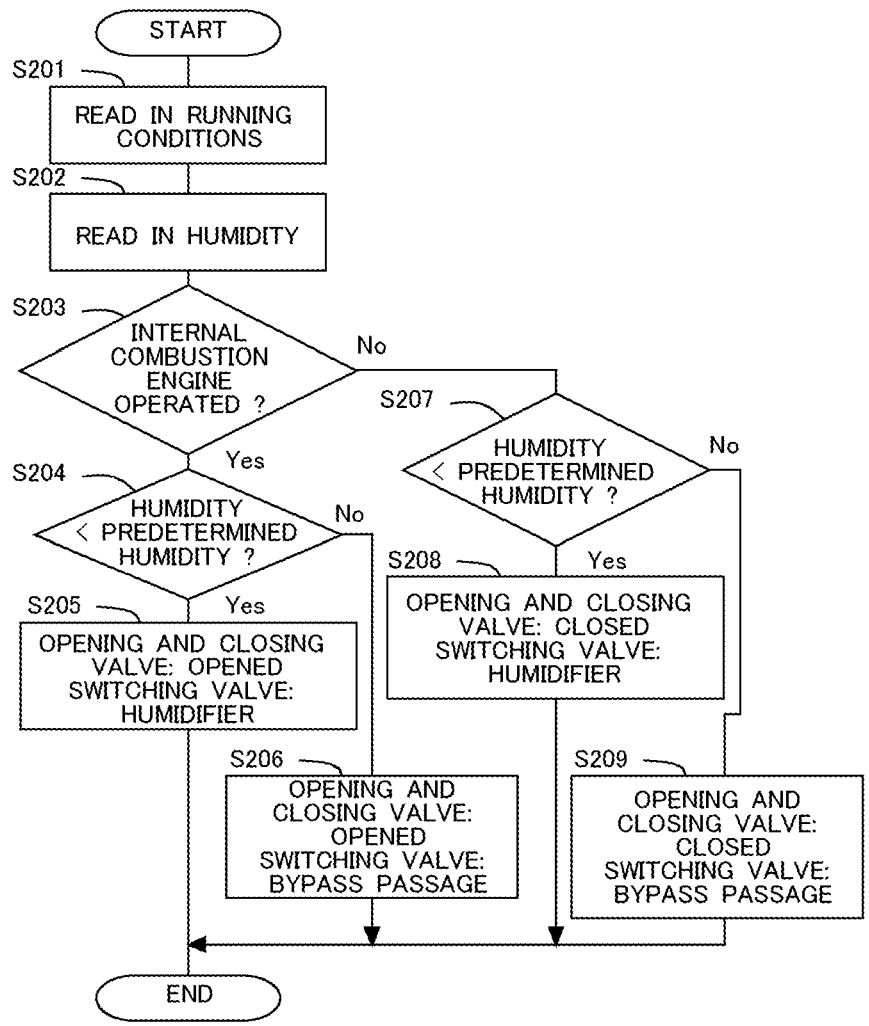
FIG. 9 is a flow chart illustrating a control flow or routine for separating carbon dioxide according to the fourth embodiment of the present disclosure.

The schematic configuration of a carbon dioxide separation system 100 according to a fourth embodiment of the present disclosure is illustrated in FIG. 3. Here, when the humidity detected by the humidity sensor 6 is sufficiently high even if water vapor is not supplied to the carbon dioxide separator 12 by the humidifier 4, it is not necessary to circulate the atmosphere through the humidifier 4 by means of the switching valve 42. For that reason, in this fourth embodiment, the switching valve 42 is controlled based on the detected value of the humidity sensor 6. FIG. 9 is a flow chart illustrating a control flow or routine for separating carbon dioxide according to this fourth embodiment of the present disclosure. The routine in this flow chart is carried out by means of the ECU 10 at each predetermined time interval.

In step S201, the driving conditions are read in. Here, information capable of determining whether the internal combustion engine 1 is in operation is read in. Subsequently, in step S202, the humidity detected by the humidity sensor 6 is read in. In step S203, it is determined whether the internal combustion engine 1 is in operation. In cases where an affirmative determination is made in step S203, the routine goes to step S204, whereas in cases where a negative determination is made, the routine goes to step S207. In step S204, it is determined whether the humidity read in step S202 is less than a predetermined humidity. The predetermined humidity is a lower limit value of the humidity at which the separation efficiency of carbon dioxide in the gas separator 12 falls within an allowable range even if the amount of the water vapor to be supplied to the carbon dioxide separator 12 is not increased. In cases where an affirmative determination is made in step S204, the routine goes to step S205. In step S205, the opening and closing valve 51 is opened and the switching valve 42 is switched so that the atmosphere can circulate through the humidifier 4. That is, the atmosphere is circulated through the humidifier 4 because the amount of the water vapor to be supplied to the carbon dioxide separator 12 is not sufficient. On the other hand, in cases where a negative determination is made in step S204, the routine goes to step S206, in which the opening and closing valve 51 is opened and the switching valve 42 is switched so that the atmosphere can circulate through the bypass passage 41. That is, the atmosphere is circulated through the bypass passage 41 because the amount of the water vapor to be supplied to the carbon dioxide separator 12 is sufficient. Here, note that at the time of the operation of the internal combustion engine 1, the water vapor in the exhaust gas is supplied to the carbon dioxide separator 12 by always opening the opening and closing valve 51.

In step S207, similarly to step S204, it is determined whether the humidity read in step S202 is less than the predetermined humidity. In cases where an affirmative determination is made in step S207, the routine goes to step S208. In step S208, the opening and closing valve 51 is closed and the switching valve 42 is switched so that the atmosphere can circulate through the humidifier 4. That is, the atmosphere is circulated through the humidifier 4 because the amount of the water vapor to be supplied to the carbon dioxide separator 12 is not sufficient. On the other hand, in cases where a negative determination is made in step S207, the routine goes to step S209, in which the opening and closing valve 51 is closed and the switching valve 42 is switched so that the atmosphere can circulate through the bypass passage 41. That is, the atmosphere is circulated through the bypass passage 41 because the amount of the water vapor to be supplied to the carbon dioxide separator 12 is sufficient. Here, note that at the time of the stop of the internal combustion engine 1, the atmosphere is suppressed from flowing back into the exhaust passage 2 by always closing the opening and closing valve 51.

As described above, according to the carbon dioxide separation system 100 of this fourth embodiment, it is possible to maintain the humidity of the gas to be supplied to the carbon dioxide separator 12 in an appropriately manner, by controlling the opening and closing valve 51 and the switching valve 42 according to the driving conditions and the humidity of the gas to be supplied to the carbon dioxide separator 12. This can improve the separation efficiency of carbon dioxide.

Fifth Embodiment

Figure 10:
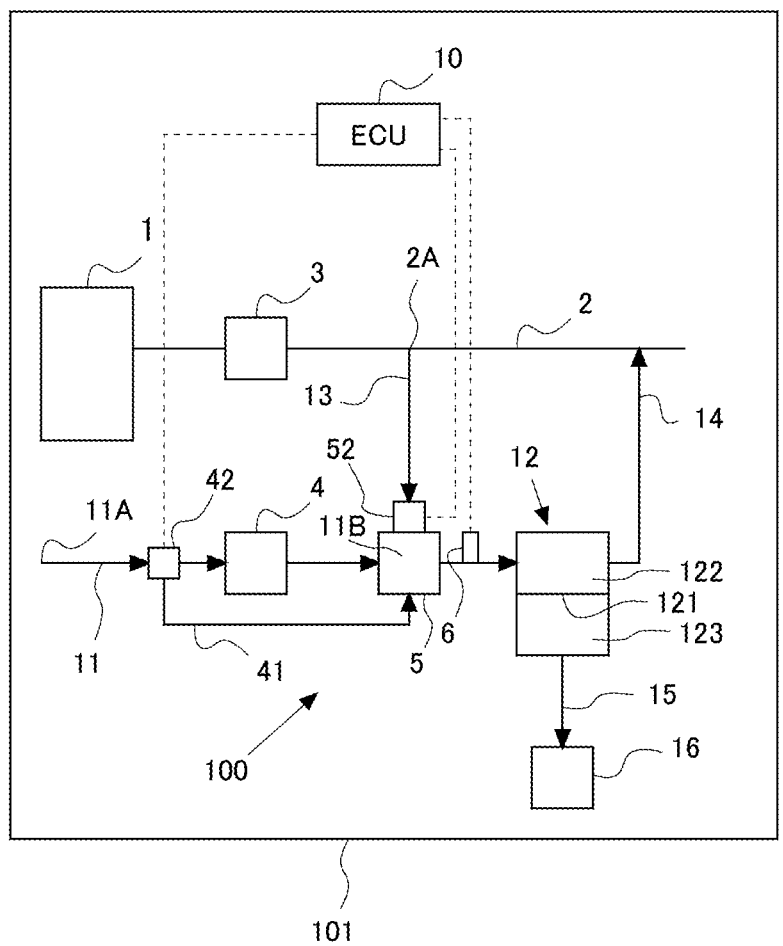
FIG. 10 is a view illustrating the schematic configuration of a carbon dioxide separation system according to a fifth embodiment of the present disclosure.

FIG. 10 is a view illustrating the schematic configuration of a carbon dioxide separation system 100 according to a fifth embodiment of the present disclosure. Differences of FIG. 10 (this fifth embodiment) from FIG. 3 (the above-mentioned third embodiment) will be mainly explained. The carbon dioxide separation system 100 according to this fifth embodiment is provided with an adjustment valve 52 at a location where the second passage 13 is connected to the gas mixing unit 5. Accordingly, the opening and closing valve 51 illustrated in FIG. 3 is not provided. The adjustment valve 52 is a valve which is adjustable to an arbitrary degree of opening, and which can adjust the amount of the exhaust gas circulating through the second passage 13. The amount of the water vapor to be supplied to the carbon dioxide separator 12 can be adjusted in a more accurate manner by this adjustment valve 52. The adjustment valve 52 is electrically connected to the ECU 10, so that the ECU 10 controls the adjustment valve 52. At this time, the processor of the ECU 10 executes a predetermined program on the main storage unit thereof. The adjustment valve 52 is an example of the second valve according to the present disclosure.

Figure 11:
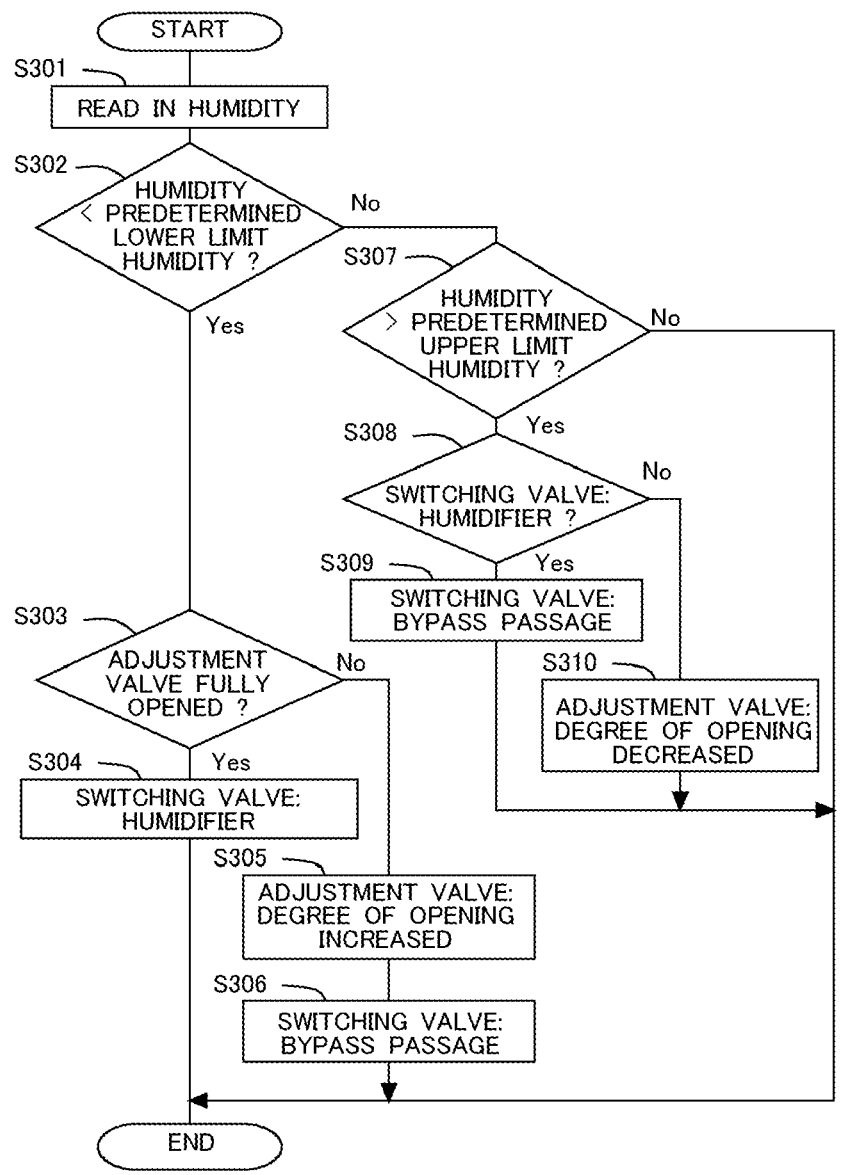
FIG. 11 is a flow chart illustrating a control flow or routine for separating carbon dioxide according to the fifth embodiment of the present disclosure.

FIG. 11 is a flow chart illustrating a control flow or routine for separating carbon dioxide according to this fifth embodiment of the present disclosure. The routine in this flow chart is carried out by means of the ECU 10 at each predetermined time interval at the time of the operation of the internal combustion engine 1. Here, note that at the time of the stop of the internal combustion engine 1, the adjustment valve 52 is fully closed, and the switching valve 42 is switched so that the atmosphere can circulate through the humidifier 4.

In step S301, the humidity detected by the humidity sensor 6 is read in. In step S302, it is determined whether the humidity read in step S301 is less than a predetermined lower limit humidity value. The predetermined lower limit humidity value is a lower limit value of the humidity at which the separation efficiency of carbon dioxide in the gas separator 12 falls within an allowable range. In cases where an affirmative determination is made in step S302, the routine goes to step S303 in order to increase the humidity of the gas to be supplied to the carbon dioxide separator 12. In step S303, it is determined whether the adjustment valve 52 is in the fully opened state. In other words, it is determined whether it is in a state where any more water vapor can not be supplied through the second passage 13. In cases where an affirmative determination is made in step S303, the routine goes to step S304, in which the switching valve 42 is switched so that the atmosphere can circulate through the humidifier 4. On the other hand, in cases where a negative determination is made in step S303, the routine goes to step S305, in which the degree of opening of the adjustment valve 52 is increased from a degree of opening at the current point in time. The degree of opening of the adjustment valve 52 may be increased by a predetermined amount, or may be increased according to the humidity read in step S301. Then, in step S306, the switching valve 42 is switched so that the atmosphere can circulate through the bypass passage 41.

On the other hand, in cases where a negative determination is made in step S302, the routine goes to step S307. In step S307, it is determined whether the humidity read in step S301 is higher than a predetermined upper limit humidity value. The predetermined upper limit humidity value is an upper limit value of the humidity at which the separation efficiency of carbon dioxide in the gas separator 12 falls within the allowable range. Here, when the humidity is too high, water drop may adhere to the carbon dioxide separation membrane 121 of the carbon dioxide separator 12, and the separation efficiency of carbon dioxide may become lower, so in cases where it is too humid, the humidity is decreased. For this reason, in cases where an affirmative determination is made in step S307, the routine goes to step S308. On the other hand, in cases where a negative determination is made in step S307, the current state of the switching valve 42 and the current degree of opening of the adjustment valve 52 are maintained by ending the routine of this flow chart.

Then, in step S308, it is determined whether the switching valve 42 has been switched so that the atmosphere can circulate through the humidifier 4. In other words, it is determined whether it is possible to decrease the humidity by circulating the atmosphere through the bypass passage 41. In cases where an affirmative determination is made in step S308, the routine goes to step S309, in which the switching valve 42 is switched so that the atmosphere can circulate through the bypass passage 41. On the other hand, in cases where a negative determination is made in step S308, the routine goes to step S310. In step 310, the degree of opening of the adjustment valve 52 is decreased from a degree of opening at the current point in time. The degree of opening of the adjustment valve 52 may be decreased by a predetermined amount, or may be decreased according to the humidity read in step S301. In addition, an amount of increase in step S305 and an amount of decrease in step S310 may be the same as each other or different from each other.

As described above, according to this fifth embodiment, it is possible to adjust the humidity of the gas to be supplied to the carbon dioxide separator 12 so as to be more appropriate by adjusting the degree of opening of the adjustment valve 52. As a result of this, the separation efficiency of carbon dioxide can be further enhanced. Here, note that the temperature or humidity of the exhaust gas may be detected in the exhaust passage 2 or the second passage 13, so that the degree of opening of the adjustment valve 52 can also be adjusted so as to make constant the humidity of the gas to be supplied to the carbon dioxide separator 12.

Sixth Embodiment

Figure 12:
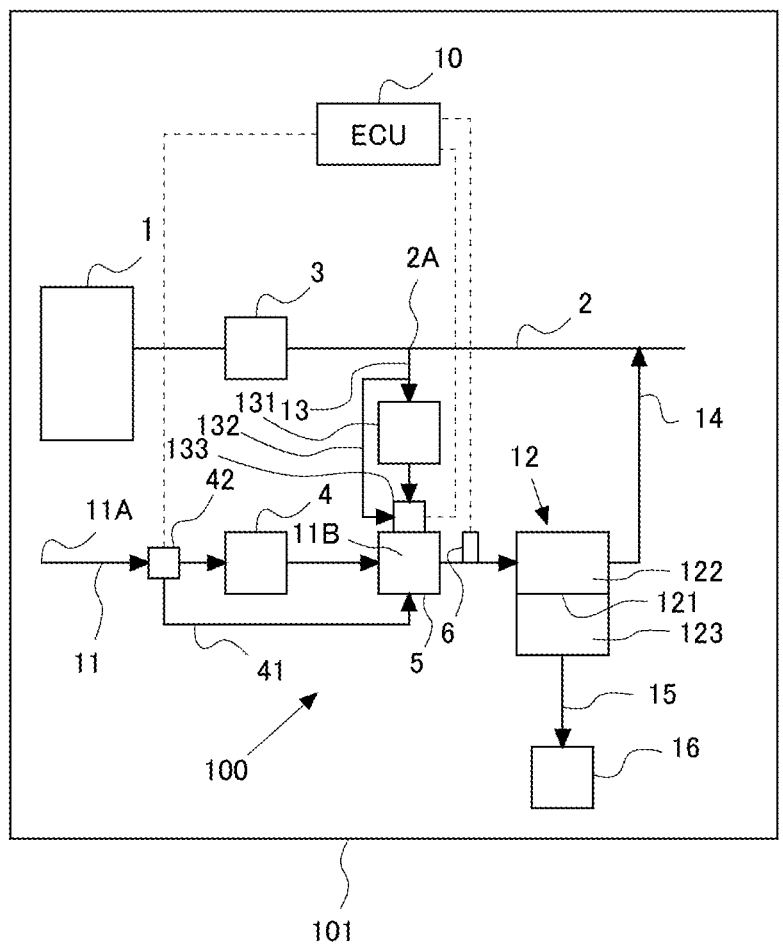
FIG. 12 is a view illustrating the schematic configuration of a carbon dioxide separation system according to a sixth embodiment of the present disclosure.

FIG. 12 is a view illustrating the schematic configuration of a carbon dioxide separation system 100 according to a sixth embodiment of the present disclosure. Differences of FIG. 12 (this sixth embodiment) from FIG. 10 (the above-mentioned fifth embodiment) will be mainly explained. The carbon dioxide separation system 100 according to this sixth embodiment has a second humidifier 131 arranged in the second passage 13. The second humidifier 131 may be of the same structure as the humidifier 4, or may be of a structure different from that.

In addition, the carbon dioxide separation system 100 according to this sixth embodiment further has a second bypass passage 132 that is a passage for connecting an upstream side and a downstream side of the second humidifier 131, while bypassing the second humidifier 131, and a second switching valve 133 that switches a passage in order to circulate gas to either one of the second humidifier 131 and the second bypass passage 132. Here, note that the second bypass passage 132 is connected at one end thereof to the second passage 13 at a location between the branch portion 2A and the second humidifier 131, and at the other end thereof to the second switching valve 133. The second switching valve 133 is arranged at a location at which the second passage 13 is connected to the gas mixing unit 5. Here, although in this sixth embodiment, the second bypass passage 132 is provided, it is not required if the humidification to the gas passing through the second humidifier 131 can be stopped by stopping the function of the second humidifier 131. That is, the function of the second humidifier 131 may be stopped, instead of circulating the gas through the second bypass passage 132. The second switching valve 133 is electrically connected to the ECU 10, so that the ECU 10 controls the second switching valve 133. At this time, the processor of the ECU 10 executes a predetermined program on the main storage unit thereof.

The ECU 10 carries out the humidification by the second humidifier 131 in place of, or together with, the humidifier 4. For example, in cases where the humidity detected by the humidity sensor 6 is less than the predetermined humidity, the second humidifier 131 and the gas mixing unit 5 may be placed in communication with each other by the second switching valve 133, whereas in cases where the detected humidity is equal to or higher than the predetermined humidity, the second bypass passage 132 and the gas mixing unit 5 may be placed in communication with each other by the second switching valve 133. Here, note that except during the operation of the internal combustion engine 1, the exhaust gas does not circulate through the second passage 13, so the above-mentioned control of the second switching valve 133 is carried out during the operation of the internal combustion engine 1. When the internal combustion engine 1 has been stopped, the second switching valve 133 may interrupt the communication of the second humidifier 131 and the second bypass passage 132 with the gas mixing unit 5.

As described above, according to this sixth embodiment, by the provision of the second humidifier 131 in the second passage 13, it is possible to adjust the humidity of the gas to be supplied to the carbon dioxide separator 12 so as to be more appropriate. As a result, the separation efficiency of carbon dioxide can be further enhanced.

What is claimed is:

1. A gas separation system which is mounted on a vehicle provided with an internal combustion engine, the system comprising:
   a gas separator configured to separate a predetermined component in a gas under the existence of water;
   a first passage connected to the gas separator so as to introduce an atmosphere into the gas separator; and
   a second passage connecting between an exhaust passage of the internal combustion engine and the first passage so as to introduce exhaust gas of the internal combustion engine into the gas separator, wherein
      the gas separator has a gas separation membrane configured to separate a gas supply side and a gas permeation side; and
      the first passage is connected to the gas supply side.

2. A gas separation system which is mounted on a vehicle provided with an internal combustion engine, the system comprising:
   a gas separator configured to separate a predetermined component in a gas under the existence of water;
   a first passage connected to the gas separator so as to introduce an atmosphere into the gas separator;
   a second passage connecting between an exhaust passage of the internal combustion engine and the first passage so as to introduce exhaust gas of the internal combustion engine into the gas separator;
   a first humidifier configured to perform humidification to the atmosphere flowing through the first passage;
   a bypass passage arranged to bypass the first humidifier;
   a switching valve configured to switch a path through which the atmosphere flows to either one of the first humidifier and the bypass passage; and
   a second valve configured to adjust a flow rate of the exhaust gas in the second passage; wherein
      the gas separator has a gas separation membrane configured to separate a gas supply side and a gas permeation side; and
      the first passage is connected to the gas supply side.

3. The gas separation system as set forth in claim 2, further comprising:
   a controller configured to perform a task that the second valve is fully closed at the time of stop of the internal combustion engine.

4. The gas separation system as set forth in claim 2, further comprising:
   a controller configured to perform a task that in cases where an amount of the atmosphere circulating through the first passage is less than a threshold value at the time of operation of the internal combustion engine, the atmosphere is circulated through the bypass passage by means of the switching valve, and the second valve is opened.

5. The gas separation system as set forth in claim 2, further comprising:
   a controller configured to perform a task that in cases where an amount of the atmosphere circulating through the first passage is equal to or larger than a threshold value at the time of operation of the internal combustion engine, the atmosphere is circulated through the first humidifier by means of the switching valve, and the second valve is opened.

6. The gas separation system as set forth in claim 2, further comprising:
   a controller configured to perform a task that
   in cases where the humidity of the gas to be introduced into the gas separator is less than a predetermined humidity at the time of operation of the internal combustion engine, the atmosphere is circulated through the first humidifier by means of the switching valve, and the second valve is opened, or
   in cases where the humidity of the gas to be introduced into the gas separator is equal to or higher than the predetermined humidity at the time of operation of the internal combustion engine, the atmosphere is circulated through the bypass passage by means of the switching valve, and the second valve is opened.

7. The gas separation system as set forth in claim 2, further comprising:
   a controller configured to perform a task that
   in cases where the humidity of the gas to be introduced into the gas separator is lower than a lower limit value of a predetermined range,
   the atmosphere is circulated through the bypass passage by means of the switching valve, and the degree of opening of the second valve is made larger than a degree of opening thereof at a current point in time in cases where the second valve is not in a fully opened state, or
   the atmosphere is circulated through the first humidifier by means of the switching valve in cases where the second valve is in the fully opened state.

8. The gas separation system as set forth in claim 2, further comprising:
   a controller configured to perform a task that
   in cases where the humidity of the gas to be introduced into the gas separator is higher than an upper limit value of a predetermined range,
   the switching valve is switched so as to allow the atmosphere to circulate through the bypass passage in cases where the atmosphere is circulated through the first humidifier by means of the switching valve, or
   the degree of opening of the second valve is made smaller than a degree of opening thereof at a current point in time, in cases where the atmosphere is circulated through the bypass passage by means of the switching valve.

9. A gas separation system which is mounted on a vehicle provided with an internal combustion engine, the system comprising:
   a gas separator configured to separate a predetermined component in a gas under the existence of water;
   a first passage connected to the gas separator so as to introduce an atmosphere into the gas separator;
   a second passage connecting between an exhaust passage of the internal combustion engine and the first passage so as to introduce exhaust gas of the internal combustion engine into the gas separator;
   a first humidifier configured to perform humidification to the atmosphere flowing through the first passage;
   a first bypass passage arranged to bypass the first humidifier;

a first switching valve configured to switch a path through which the atmosphere flows to either one of the first humidifier and the first bypass passage;

a second humidifier configured to humidify the exhaust gas of the internal combustion engine circulating through the second passage;

a second bypass passage arranged to bypass the second humidifier;

a second switching valve configured to switch a path through which the exhaust gas of the internal combustion engine flows to either one of the second humidifier and the second bypass passage; and a controller configured to perform a task that in cases where the humidity of the gas to be introduced into the gas separator is less than a predetermined humidity, the exhaust gas of the internal combustion engine is circulated through the second humidifier by means of the second switching valve, or in cases where the humidity of the gas to be introduced into the gas separator is equal to or higher than the predetermined humidity, the exhaust gas of the internal combustion engine is circulated through the second bypass passage by means of the second switching valve; wherein the gas separator has a gas separation membrane configured to separate a gas supply side and a gas permeation side; and the first passage is connected to the gas supply side.

10. A gas separation system which is mounted on a vehicle provided with an internal combustion engine, the system comprising:

a gas separator configured to separate a predetermined component in a gas under the existence of water;

a first passage connected to the gas separator so as to introduce an atmosphere into the gas separator;

a second passage connecting between an exhaust passage of the internal combustion engine and the first passage so as to introduce exhaust gas of the internal combustion engine into the gas separator;

an exhaust gas purification device configured to purify the exhaust gas of the internal combustion engine, the exhaust gas purification device being arranged in the exhaust passage at the upstream side of a location at which the second passage is connected to the exhaust passage; wherein the gas separator has a gas separation membrane configured to separate a gas supply side and a gas permeation side; and the first passage is connected to the gas supply side.

* * * * *